(12) United States Patent
Westerman

(10) Patent No.: US 7,932,896 B2
(45) Date of Patent: Apr. 26, 2011

(54) TECHNIQUES FOR REDUCING JITTER FOR TAPS

(75) Inventor: Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 986 days.

(21) Appl. No.: 11/818,476

(22) Filed: Jun. 13, 2007

(65) Prior Publication Data
US 2008/0309630 A1    Dec. 18, 2008

(51) Int. Cl.
*G06F 3/041* (2006.01)
(52) U.S. Cl. ..................................... 345/173
(58) Field of Classification Search ............... None
See application file for complete search history.

(56) References Cited

U.S. PATENT DOCUMENTS

| | | | |
|---|---|---|---|
| 4,686,331 A * | 8/1987 | Burgess | 178/18.01 |
| 5,229,551 A * | 7/1993 | McDermott et al. | 178/18.02 |
| 5,488,204 A | 1/1996 | Mead et al. | |
| 5,666,113 A | 9/1997 | Logan | |
| 5,880,411 A | 3/1999 | Gillespie et al. | |
| 6,188,391 B1 | 2/2001 | Seely et al. | |
| 6,288,711 B1 * | 9/2001 | Tanaka et al. | 345/179 |
| 6,323,846 B1 | 11/2001 | Westerman et al. | |
| 2002/0056575 A1 | 5/2002 | Keely et al. | |
| 2004/0246240 A1 | 12/2004 | Kolmykov-Zotov et al. | |
| 2006/0026521 A1 | 2/2006 | Hotelling et al. | |
| 2006/0092142 A1 | 5/2006 | Gillespie et al. | |
| 2006/0097991 A1 | 5/2006 | Hotelling et al. | |
| 2006/0197753 A1 | 9/2006 | Hotelling | |
| 2006/0232567 A1 | 10/2006 | Westerman et al. | |
| 2006/0238521 A1 * | 10/2006 | Westerman et al. | 345/173 |
| 2007/0229466 A1 | 10/2007 | Peng et al. | |
| 2007/0291009 A1 | 12/2007 | Wright et al. | |
| 2008/0165140 A1 | 7/2008 | Christie et al. | |

FOREIGN PATENT DOCUMENTS

| | | |
|---|---|---|
| WO | WO-2008/157239 A2 | 12/2008 |
| WO | WO-2008/157239 A3 | 12/2008 |

OTHER PUBLICATIONS

International Search Report mailed Oct. 23, 2009, for PCT Application No. PCT/US2008/066729, filed Jun. 12, 2008, six pages.

* cited by examiner

*Primary Examiner* — Alexander Eisen
*Assistant Examiner* — Matthew Yeung
(74) *Attorney, Agent, or Firm* — Morrison & Foerster LLP

(57) ABSTRACT

Distinguishing sloppy taps from sliding motions is disclosed using an algorithm that can take into account both a time instability factor Tinst and a touch instability factor Zinst. A limited amount of motion per frame can be subtracted off immediately following the detection of a touch event. Small lateral motions indicative of a sloppy tap can be suppressed, while fast finger motions indicative of a quick, long cursor movement can immediately pass through the filter without being suppressed by a significant amount. A motion pass-through suppression factor can be applied subtractively to motion in particular direction as a function of Zinst and Tinst, wherein Zinst can represent a suppression value given as a finger speed for a particular percentage change in touch instability per frame, and Tinst can represent a suppression value given as finger speed for a particular tpress.

66 Claims, 6 Drawing Sheets

TECHNIQUES FOR REDUCING JITTER FOR TAPS

FIELD OF THE INVENTION

This relates to touch sensor panels used as input devices for computing systems, and more particularly, to techniques for determining whether a touch event detected at the touch sensor panel with some amount of sliding movement should be interpreted as a "tapping" gesture or a "sliding" gesture.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

When using a touch screen, a user can make a selection on the display screen by pointing directly to objects (such as GUI objects) displayed on the screen (usually with a stylus or finger) and touching the screen at that location. To provide additional functionality, gesture recognition can be implemented to recognize more than a simple finger touch. By way of example, various operations such as a selection function can be made when one or more taps are detected on the surface of the touch screen. In addition to taps, various operations such as dragging or scrolling functions can be made when a sliding motion is detected on the surface of the touch screen. Tapping and sliding gestures are described in Applicant's co-pending U.S. patent application Ser. No. 11/818,341 entitled "Detecting Gestures on Multi-Event Sensitive Devices," filed on Jun. 13, 2007 the contents of which are incorporated by reference herein.

However, it can be difficult for a user to control finger motion to produce a tapping motion with little or no sliding motion. Tapping gestures with some amount of sliding motion, so-called "sloppy taps," can be difficult to distinguish from a true sliding gesture as intended by the user.

The problem of distinguish sloppy taps from sliding motions can pose contradictory objectives: reliably producing clicks (e.g. selection operations) in response to sloppy taps that including some amount of finger sliding or rolling motion, versus issuing point/drag/scroll events quickly enough in response to intentional slides such that the user perceives little or no lag or lost motion. Some touch sensor panel systems have attempted to distinguish sloppy taps from sliding motions by suppressing all motion or a percentage of finger motion for a certain period of time (e.g. several hundred milliseconds) after a touch event was detected. However, such approaches can lead to excessive suppression of intended sliding motions, especially for quick sliding motions of a short duration.

SUMMARY OF THE INVENTION

This relates to distinguish sloppy taps from sliding motions using an algorithm that can take into account both a time instability factor and a touch instability factor. A limited amount of motion per frame can be subtracted off or canceled during a time period immediately following the detection of a touch event. Small lateral motions indicative of a sloppy tap can be suppressed, while fast finger motions indicative of a quick, long cursor movement can immediately pass through the filter without being suppressed by a significant amount.

A motion pass-through suppression factor can be applied subtractively to motion in the X-direction, $\Delta X$. In particular, the raw $\Delta X$ value can be modified as a function of tpress according to the formula:

$$\begin{aligned}
\Delta Xsuppr(tpress) &= \Delta X - \max(Zinst, Tinst) && (\text{if } \Delta X > 0 \text{ and } \max(Zinst, Tinst) \leq |\Delta X|), \text{ or} \\
&= \Delta X + \max(Zinst, Tinst) && (\text{if } \Delta X < 0 \text{ and } \max(Zinst, Tinst) \leq |\Delta X|), \text{ or} \\
&= 0 && (\text{if } \max(Zinst, Tinst) > |\Delta X|),
\end{aligned}$$

wherein Zinst can represent a suppression value given as a finger speed in the X direction for a particular percentage change in Z per frame, and Tinst can represent a suppression value given as finger speed in the X direction for a particular tpress. Thus, it should be understood that, on a per frame basis, Zinst and Tinst can have the same units as $\Delta X$, which can be a distance measurement such as millimeters (mm). Both Zinst and Tinst can have as an upper bound the maximum amount of travel in the X direction for a sloppy tap. The same suppression can be applied to motion in the Y-direction.

BRIEF DESCRIPTION OF THE DRAWINGS

FIG. 3b illustrates an exemplary plot of time vs. $\Delta X$ and $\Delta Y$ for the series of touch events shown in FIG. 3a.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to distinguish sloppy taps from sliding motions using an algorithm that can take into account both a time instability factor and a touch instability factor. A limited amount of motion per frame can be subtracted off or canceled during a time period immediately following the detection of a touch event. Small lateral motions indicative of a sloppy tap can be suppressed, while fast finger motions indicative of a quick, long cursor movement can immediately pass through the filter without being suppressed by a significant amount.

Although some embodiments of this invention may be described herein in terms of identifying a tapping or sliding gesture from a single touch detected on a sensor panel, it should be understood that embodiments of this invention are not limited to single-touch sensor panels, but can be generally applicable to either single-touch or multi-touch sensor panels, the latter of which is described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein. Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations.

Figure 1:
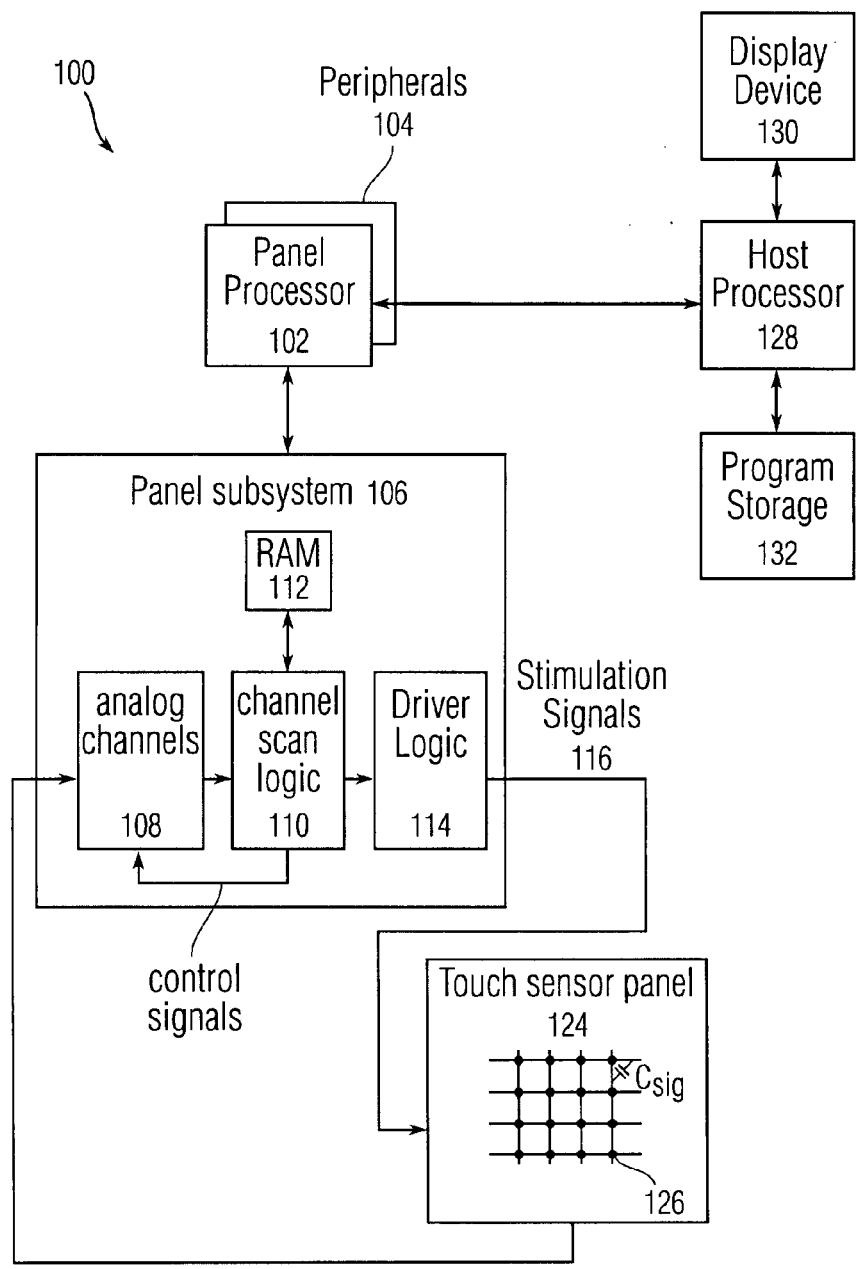
FIG. 1 illustrates an exemplary computing system implementing the algorithm for distinguishing sloppy taps from sliding motions according to one embodiment of this invention.

FIG. 1 illustrates exemplary computing system 100 implementing the algorithm for distinguishing sloppy taps from sliding motions according to embodiments of the invention. Computing system 100 can include one or more panel processors 102 and peripherals 104, and panel subsystem 106. One or more panel processors 102 can include, for example, ARM968 processors or other processors with similar functionality and capabilities. However, in other embodiments, the panel processor functionality can be implemented instead by dedicated logic, such as a state machine. One or more panel processors 102 or host processor 128 can execute software or firmware implementing the algorithm for distinguishing sloppy taps from sliding motions according to embodiments of the invention. Peripherals 104 can include, but are not limited to, random access memory (RAM) or other types of memory or storage, watchdog timers and the like. Panel subsystem 106 can include, but is not limited to, one or more analog channels 108, channel scan logic 110 and driver logic 114. Channel scan logic 110 can access RAM 112, autonomously read data from the analog channels and provide control for the analog channels. In addition, channel scan logic 110 can control driver logic 114 to generate stimulation signals 116 at one or more frequencies and phases that can be selectively applied to rows of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of row traces or driving lines and a plurality of column traces or sensing lines, although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substantially transparent substrate separated by a substantially transparent dielectric material, on opposite sides of the substrate, or on two separate substrates separated by the dielectric material.

At the "intersections" of the traces, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 126, which can be particularly useful when touch sensor panel 124 is viewed as capturing an "image" of touch over a frame (one complete scan of the panel). (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes appears as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig. Each column of touch sensor panel 124 can drive one or more analog channels 108 (also referred to herein as an event detection and demodulation circuit) in panel subsystem 106.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device.

Figure 2:
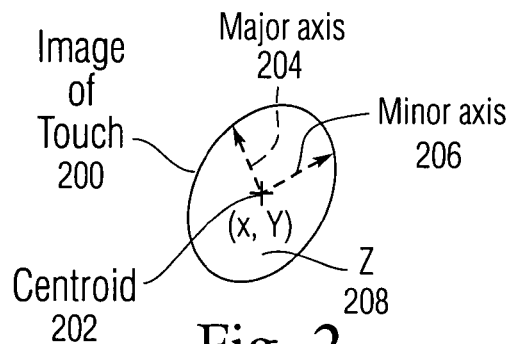
FIG. 2 illustrates exemplary image of touch.

FIG. 2 illustrates exemplary image of touch 200, which can be defined as having centroid 202 at the "center of mass" (X,Y) of the touch image with major and minor axes 204 and 206 defining the approximate boundaries of the touch area. Z 208 can be defined as the total finger signal (computed as the sum of all the capacitance for a finger as detected by the analog channels) integrated over the touch area.

Figure 3A:
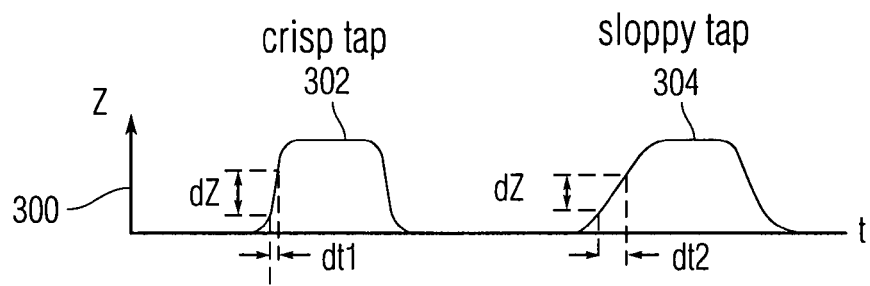
FIG. 3a illustrates an exemplary plot of time vs. Z for a series of touch events.

FIG. 3a illustrates exemplary plot 300 of time vs. Z for a series of touch events. First bump 302 in FIG. 3a can be caused by a crisp finger tap, which can produce sharp rises and falls in Z as the finger touches down and lifts off the touch surface. A crisp tap can be characterized by a rise in Z of dZ in time dt1. Second bump 304 can be caused by a sloppy finger tap, which can produce more gradual rises and falls in Z. The rise in Z of dZ in time dt2 can be slower in a sloppy tap. Note that a sliding motion can appear as a bump of a longer duration in FIG. 3a, most likely with gradual rise and fall times.

Figure 3B:
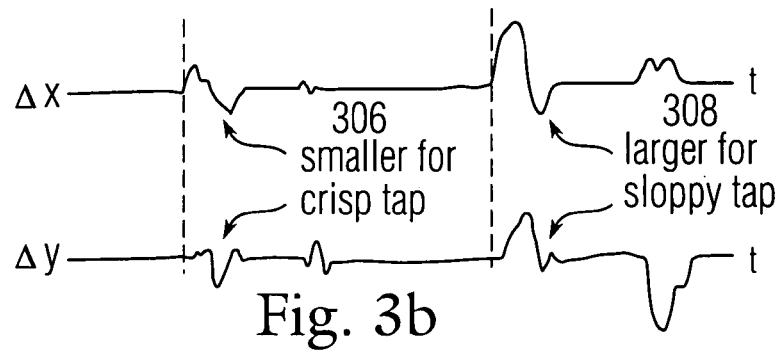

FIG. 3b illustrates an exemplary plot of time vs. ΔX and ΔY for the series of touch events shown in FIG. 3a. ΔX and ΔY can represent the change in the X and Y locations of the centroid within the touch area per frame (the time of one full panel scan). Note that a sharp or crisp finger tap can have generally smaller ΔX and ΔY values (see 306), because such finger taps can have less slipping or sliding in the X and/or Y directions. However, a sloppy finger tap can have generally higher ΔX and ΔY values (see 308). Note that a sliding touch can produce high ΔX and/or ΔY values for the duration of the slide, depending on the direction of the motion.

To distinguish between sloppy taps and sliding motions, lateral motion in one or more directions can be suppressed. For example, in the X-direction, a "ΔX suppr" value can be computed by modifying the raw ΔX value by some factor. Some touch sensor panel systems can modify the raw ΔX value as a function of the time since a touch event was detected, tpress, according to the formula:

$$\Delta X\text{suppr}(tpress) = \Delta X \ast (Z/(Z+|dZ|)) \ast (tpress/(50+tpress)),$$

wherein Z is the total finger signal at time tpress, and |dZ| is the magnitude of the change in Z at time tpress. (Z/(Z+|dZ|)) can be referred to as the touch pass-thru factor, and (tpress/(50+tpress)) can be referred to as the time pass-thru factor. Together, (Z/(Z+|dZ|))*(tpress/(50+tpress)) can be referred to as the motion pass-thru factor. Accordingly, for small tpress, the time pass-thru factor can approach zero, and suppression can be at a maximum. As tpress increases, the time pass-thru factor can approach one, and suppression can be at a minimum. In addition, for small dZ values indicative of a crisp tap, the touch pass-thru factor can approach one. As Z increases, the effect of |dZ| can be decreased. For larger dZ values when Z is not yet large, the touch pass-thru factor can approach zero, and suppression can be at a maximum.

Figure 3C:
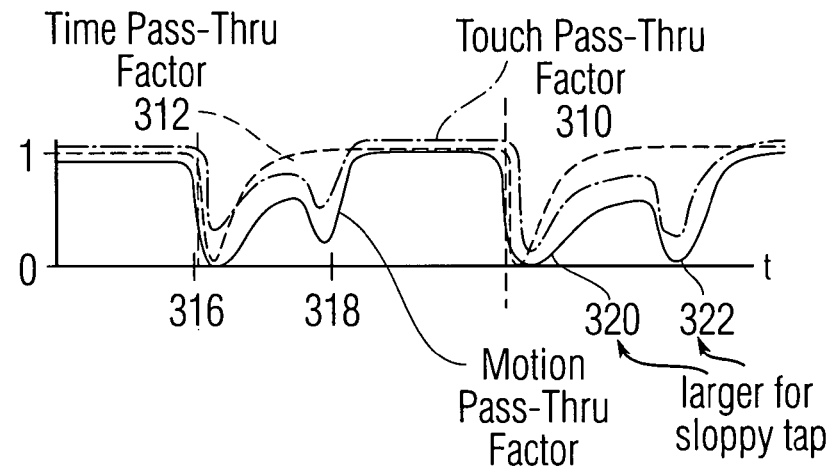
FIG. 3c contains an exemplary plot of a touch pass-thru factor, a time pass-thru factor, and a combined motion pass-thru factor over time for the series of touch events shown in FIG. 3a according to one embodiment of this invention.

FIG. 3c illustrates an exemplary plot of touch pass-thru factor 310 (dot-dash line), time pass-thru factor 312 (dashed line), and combined motion pass-thru factor 314 (solid line) over time for the series of touch events shown in FIG. 3a according to embodiments of the invention. FIG. 3c shows that for motion in the X direction, the touch pass-thru factor can be lowest (i.e. suppression can be greatest) when the tap is first detected at 316 to suppress any inadvertent sliding motions, and also at liftoff 318, when again there may be some inadvertent sliding. Sloppy tap 304 can generally lead to a lower touch pass-thru factor than crisp tap 302, due to the larger |dZ| value (see suppression areas 320 and 322). Additionally, the suppression at touchdown or liftoff can help to suppress changes to the centroid location that are not necessarily due to sliding, but rather due to the change in the center of mass of the centroid as it rapidly changes shape as it rolls on or off during touchdown or liftoff.

In addition, FIG. 3c also illustrates time pass-thru factor 312, showing that the time pass-thru factor can be lowest (i.e. suppression can be greatest) when a touch is first detected at 316, and increases after that point. If a liftoff or touchdown of one finger is detected and the touch and time pass-thru factors of FIG. 3c are obtained over time, the total motion pass-thru factor 314 can also be applied to all other fingers on the same hand under the assumption that the liftoff or touchdown of one finger can cause an unstable hand position and slipping of the other fingers.

One disadvantage of the approach described above can be that the motion pass-through suppression factor can be applied multiplicatively to ΔX. Because of this, in a quick swipe, much of the swipe can be ignored due to the time pass-thru factor, and response to the swipe can be too slow. Additionally, for slower motion swipes, where the time pass-thru factor does not really affect the swipe, the amount of suppression could have been larger to avoid detecting sloppy taps as sliding.

Therefore, according to embodiments of the invention, the motion pass-through suppression factor can be applied subtractively to ΔX. In particular, the raw ΔX value can be modified as a function of tpress according to the formula:

$$\begin{aligned}\Delta X\text{suppr}(tpress) &= \Delta X - \max(Zinst, Tinst) \quad (\text{if } \Delta X > 0 \text{ and } \max(Zinst, Tinst) \le |\Delta X|), \text{ or} \\ &= \Delta X + \max(Zinst, Tinst) \quad (\text{if } \Delta X < 0 \text{ and } \max(Zinst, Tinst) \le |\Delta X|), \text{ or}\end{aligned}$$

$$= 0 \qquad \text{(if max}(Zinst, Tinst) > |\Delta X|),$$

wherein Zinst can represent a suppression value given as a finger speed in the X direction for a particular percentage change in Z per frame, and Tinst can represent a suppression value given as finger speed in the X direction for a particular tpress. Thus, it should be understood that, on a per frame basis, Zinst and Tinst can have the same units as $\Delta X$, which can be a distance measurement such as millimeters (mm). Both Zinst and Tinst can have as an upper bound the maximum amount of travel in the X direction for a sloppy tap (e.g. 2 mm).

Figure 4:
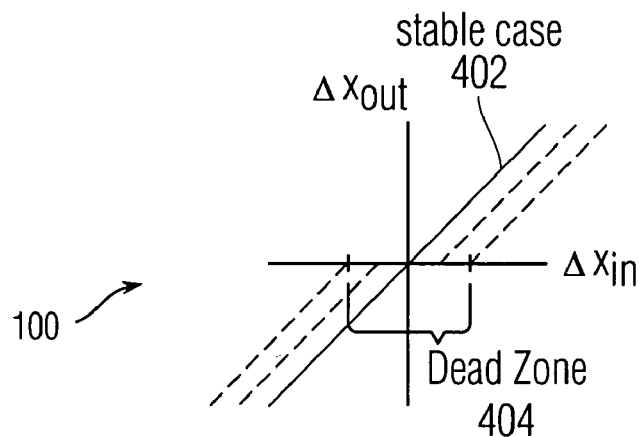
FIG. 4 illustrates an exemplary plot of an input $\Delta X$ ($\Delta Xin$) vs. an output $\Delta X$ ($\Delta Xout$), wherein the plot represents a $\Delta Xsuppr$ function at a particular moment in time (tpress) according to one embodiment of this invention.

FIG. 4 illustrates an exemplary plot 400 of an input $\Delta X$ ($\Delta Xin$) vs. an output $\Delta X$ ($\Delta Xout$), wherein the plot can represent the $\Delta Xsuppr$ function described above at a particular moment in time tpress according to embodiments of the invention. Note that in a stable case 402 with no suppression of the input $\Delta X$ value, $\Delta Xin = \Delta Xout$ for all values of $\Delta Xin$. However, in non-stable situations, there can be a "dead" zone 404 on either side of the y-axis in which $\Delta Xsuppr$ can be held at zero (maximum suppression) to ignore sloppy taps. The boundaries of the dead zone can be equivalent to the current maximum of Zinst and Tinst at time tpress. Outside of dead zone 404, on either side, the plots can resume a linear function. Thus, just outside the dead zone, a particular value for $\Delta Xin$ can yield a small $\Delta Xout$, indicating that a large amount of suppression is still occurring. However, as $\Delta Xin$ gets large, $\Delta Xout$ can approach $\Delta Xin$, at least on a percentage basis, indicating an ever-decreasing suppression percentage that may not be very noticeable to the user. Note that FIG. 4 can change over time, so that as instability decreases, the plots tend to move towards the stable case 402, with ever-decreasing dead zones 404.

Figure 5A:
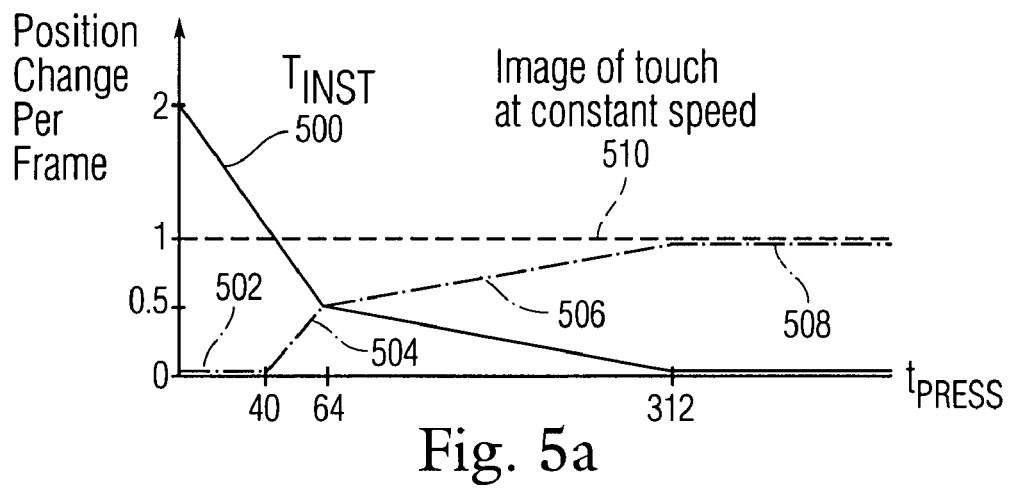
FIG. 5a illustrates an exemplary plot of tpress vs. position change per frame representing a Tinst function according to one embodiment of this invention.

FIG. 5a illustrates an exemplary plot 500 of tpress vs. position change per frame representing the Tinst function according to embodiments of the invention. For a given time tpress, the Tinst function represented by plot 500 can return a value representing an amount of suppressed position change per frame. FIG. 5a also shows an exemplary situation in which an image of touch is moving at a constant speed (i.e. a constant position change of 1 mm per frame) in the direction represented by plot 500. Until the suppressed position change per frame Tinst is less than the position change per frame of the image of touch (1 mm per frame in this example; see 510) at a particular tpress, there can be full suppression and zero reported position change per frame (see 502). Thus, there can be a significant amount of position change suppression soon after a finger touch is detected, which serves to suppress the sliding of sloppy finger taps.

As tpress increases, and the suppressed position change per frame Tinst becomes less than the position change per frame of the image of touch, the reported position change per frame starts to go positive (see 504). The reported position change per frame (see 506) continues to be a function of position change per frame of the image of touch and the suppressed position change per frame Tinst until Tinst reaches zero (at tpress=312 ms in this example), at which time there is no longer any suppression and the reported position change per frame can be equal to the position change per frame of the image of touch (see 508). Note that plot 500 is only exemplary. Embodiments of the invention can utilize a more complicated function than what is shown in FIG. 5a, which can be implemented in a lookup table or computed when needed.

Figure 5B:
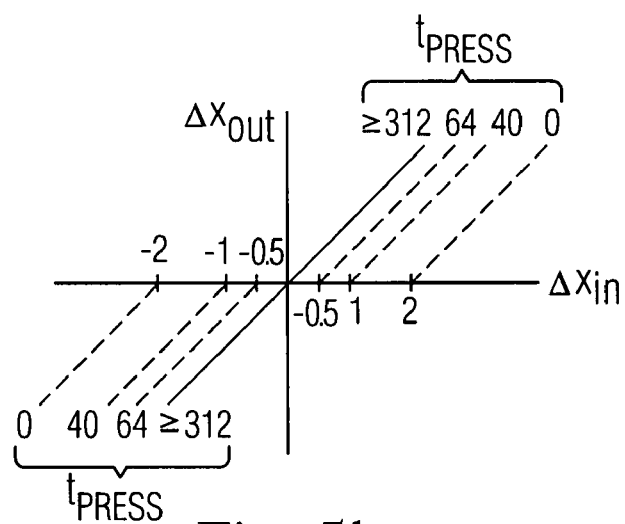
FIG. 5b illustrates an exemplary plot of $\Delta Xin$ vs. $\Delta Xout$ corresponding to the Tinst function of FIG. 5a at various moments in time tpress according to one embodiment of this invention.

FIG. 5b illustrates an exemplary plot of $\Delta Xin$ vs. $\Delta Xout$ corresponding to the Tinst function 500 of FIG. 5a at various moments in time tpress according to embodiments of the invention. Note that as time tpress increases, the instability decreases and the stable condition is reached at tpress=312.

Figure 6A:
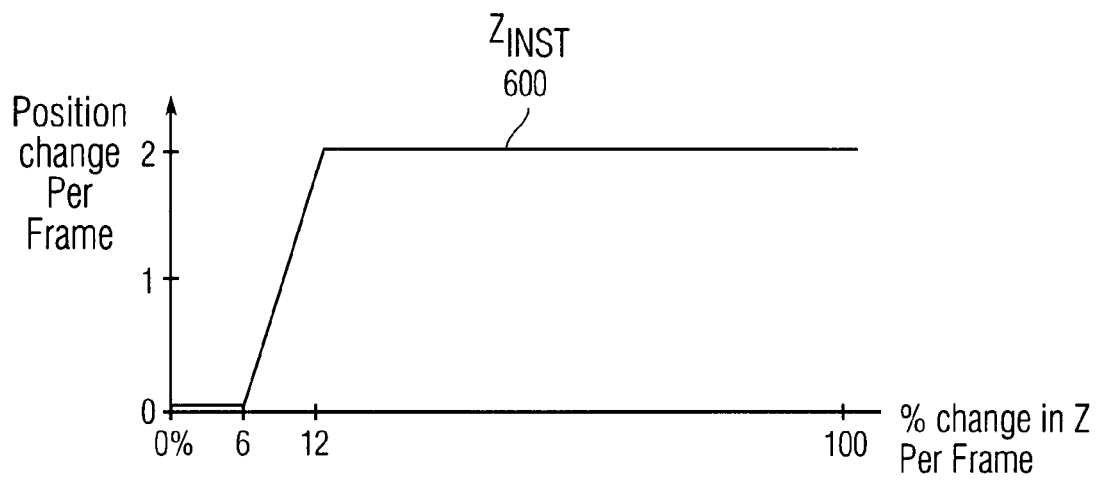
FIG. 6a illustrates an exemplary plot of instability in Z (finger touch area) per frame vs. position change per frame representing a Zinst function according to one embodiment of this invention.

FIG. 6a illustrates an exemplary plot 600 of Zinst representing a suppression value given as position change per frame vs. a percentage change in Z (touch instability) per frame. Touch instability Z, as referred to herein, can represent any of a number of parameters that can exhibit instability during taps. For example, Z can represent the touch area, which can vary greatly during the time that a user is applying a tap to a sensor panel. However, other contact measurements besides touch area can exhibit noticeable touch instability during taps, and whose instability measures can therefore be used to affect dead zone width and the suppression of position change according to embodiments of the invention. One such contact measurement is "patch density," which can be generally defined as the total signal of a particular patch divided by the radius of the patch. Patch density is disclosed in U.S. application Ser. No. 11/619,464 entitled "Multi-Touch Input Discrimination," filed on Jan. 3, 2007, the contents of which are incorporated by reference herein. Other contact measurements that can be used to suppress motion change include the major radius, eccentricity (ratio of major/minor axes), or major angle of the patch, contact force (for touch sensor panels with a compliant force-sensing layer), all of which can display instability during taps. All of these contact measurement instabilities are referred to generally herein as touch instabilities.

In FIG. 6a, for a given % change in Z per frame, the Zinst function represented by plot 600 can return a value representing an amount of suppressed position change per frame. Very small % changes in Z per frame (below 6% in the example of FIG. 6a) can be indicative of very little touch instability and therefore indicative of a sliding motion wherein the user is keeping a finger in constant contact with the touch surface. In this region of the Zinst function, there can be no suppressed position change per frame in a particular direction.

Larger % changes in Z per frame (above 12% in the example of FIG. 6a) can be indicative of large touch instability and therefore can be indicative of a tapping motion wherein the finger makes only momentary contact with the touch surface. In this region of the Zinst function, there can be maximum suppression of position change per frame in a particular direction (e.g. about 2 mm/frame). Intermediate % changes in Z per frame (between 6% and 12% in the example of FIG. 6a) can be a "gray area" within which the amount of suppression of position change per frame in a particular direction can vary linearly with respect to the % change in Z per frame. Note that plot 600 is only exemplary. Embodiments of the invention can utilize a more complicated function than what is shown in FIG. 6a, which can be implemented in a lookup table or computed when needed.

Figure 6B:
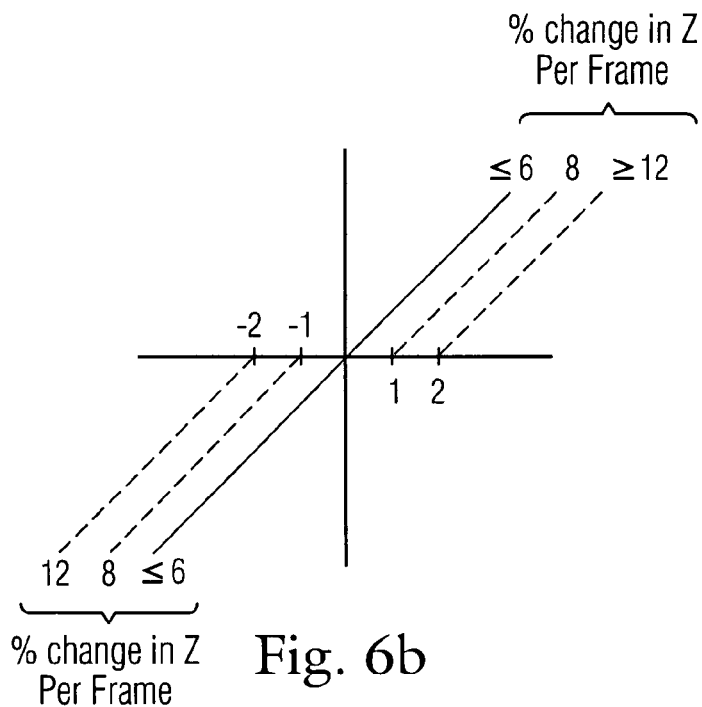
FIG. 6b illustrates an exemplary plot of ΔXin vs. ΔXout corresponding to the Zinst function of FIG. 6a at various % changes in Z per frame according to one embodiment of this invention.

FIG. 6b illustrates an exemplary plot of $\Delta Xin$ vs. $\Delta Xout$ corresponding to the Zinst function 600 of FIG. 6a at various % changes in Z per frame according to embodiments of the invention. Note that as the % change in Z per frame decreases, the instability can decrease and the stable condition can be reached at a % change in Z per frame of 6% or less.

Note that all of the above can be repeated for the Y direction to compute a suppressed position change in the Y-direction of $\Delta Ysuppr$.

Figure 7:
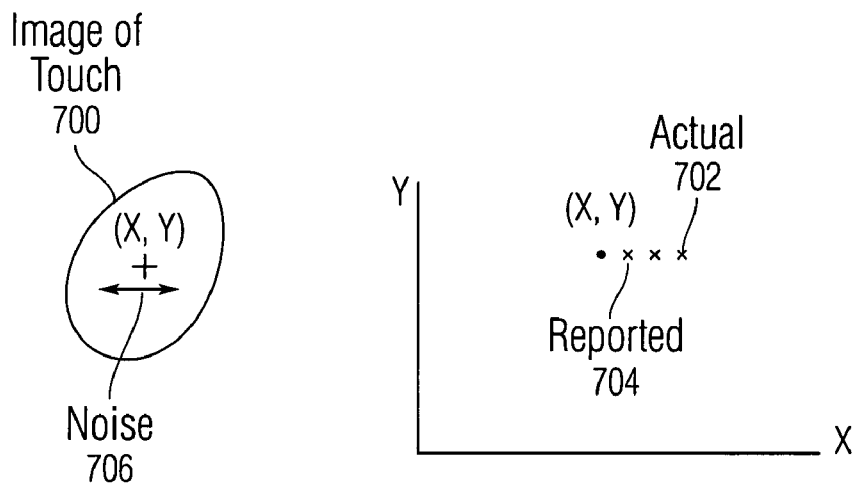
FIG. 7 is an illustration of an exemplary image of touch, and actual and reported touch screen coordinates as the X and Y coordinates change due to system noise.

FIG. 7 is an illustration of exemplary image of touch 700 and actual 702 and reported 704 touch screen coordinates as the X and Y coordinates change due to system noise. In systems utilizing absolute reporting conditions (reporting X and Y values to indicate an exact position of a centroid of an image of touch as opposed to a relative position), accurate reporting of the coordinates of an image of touch can be important. However, due to system noise, the centroid of finger touch can change slightly (see 706). In other words, the centroid can appear to move back and forth due to system noise.

To avoid interpreting this noise as a sliding motion, hysteresis can be employed in which a delay in position change is created. For example, if a position change equivalent to three pixels is detected, a hysteresis filter can be applied so that a position change of only one pixel can be reported (in other words, there is a two pixel delay). Thus, the position reported can always be two pixels behind. By ignoring the first two pixels of position change, noise can be ignored.

FIG. 7 illustrates how actual movement of three pixels in the X direction (see 702) can be reported as only one pixel of movement (see 704). This methodology can be sufficient for suppressing stationary noise jitter, but it may not be sufficient for sloppy taps which can cause movement of more than three pixels (e.g. 5-10 pixels of movement). In other words, a sloppy tap of three pixels can pass through the hysteresis filter and can be reported as movement of one pixel, which can be erroneously interpreted as a sliding motion.

Therefore, according to embodiments of the invention, a filter plug-in which can sit below an application layer in a host processor can report an absolute position, including the effects of a hysteresis filter. In other words, the application layer does not report raw position data, but rather pixel locations (hysteresis centers) after being processed by the hysteresis filter. Accordingly, if a touch location is determined, and it experiences an apparent position change that can be filtered out by the hysteresis filter, the reported position can be the original touch location. However, if the touch location experiences and apparent position change greater than what can be filtered out by the hysteresis filter, a reported position change can be produced.

In parallel, "actionable" position changes can be identified and reported. Actionable position changes can be used to control whether an apparent position change should be interpreted as a sliding motion. The application can interpret an apparent position change as a sliding motion when the actionable position change is non-zero (i.e. when an event flag is set, and ΔX and ΔY values indicate a non-zero actionable position change). Absolute position information can be used to determine the location of a tap or where a drag/scroll gesture starts, but whether or not to do the drag can be controlled by the parallel channel which can certify the apparent position changes as actionable.

For example, if a touch location has an apparent position change of three pixels, and it passes through a hysteresis filter having a delay of two pixels, the reported position will be one pixel. Normally, an actionable position change of one pixel will also be reported. However, there can be situations when the reported location of one pixel will not cause an actionable position change to be reported. If, for example, the reported position change is fully suppressed by the Tinst and/or Zinst functions described above, no actionable position change will be reported. In another example, a hovering finger can be detected as a weak image of touch, and an absolute position can be reported, but if the weak image of touch is interpreted to be a hovering finger, the event flag will not be set, the reported position change will not be certified as "actionable," and the actionable position change would be zero. Hovering fingers can be beneficially precluded from generating actionable position changes to prevent wavering of the hovering finger from being interpreted as a sliding motion.

Figure 8:
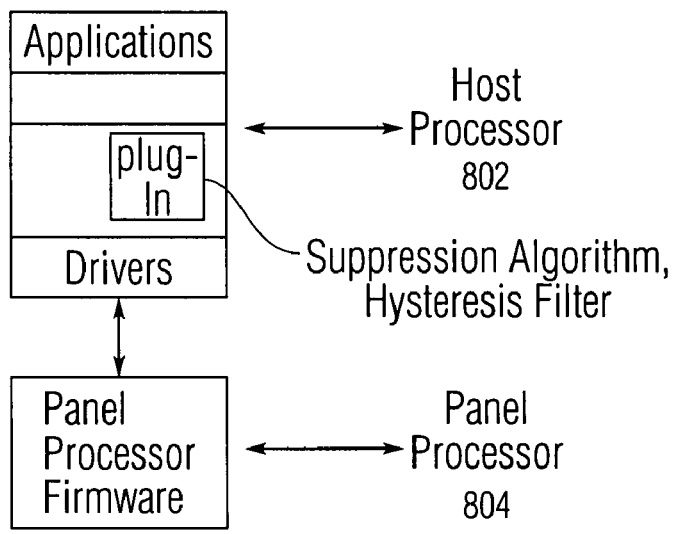
FIG. 8 illustrates an exemplary software stackup which can include X and Y suppression functions (which utilize Tinst and Zinst functions) and a hysteresis filter, and which can be executed by the computing system of FIG. 1 according to one embodiment of this invention.

FIG. 8 illustrates an exemplary software stackup which can include the X and Y suppression functions described above (which utilize the Tinst and Zinst functions described above) and the hysteresis filter described above, and which can be executed by the computing system of FIG. 1 according to embodiments of the invention. Embodiments of the invention can be implemented in a plug-in 800 being executed by host processor 802, but could also be implemented in firmware executed by panel processor 804 or any other layer.

Figure 9A:
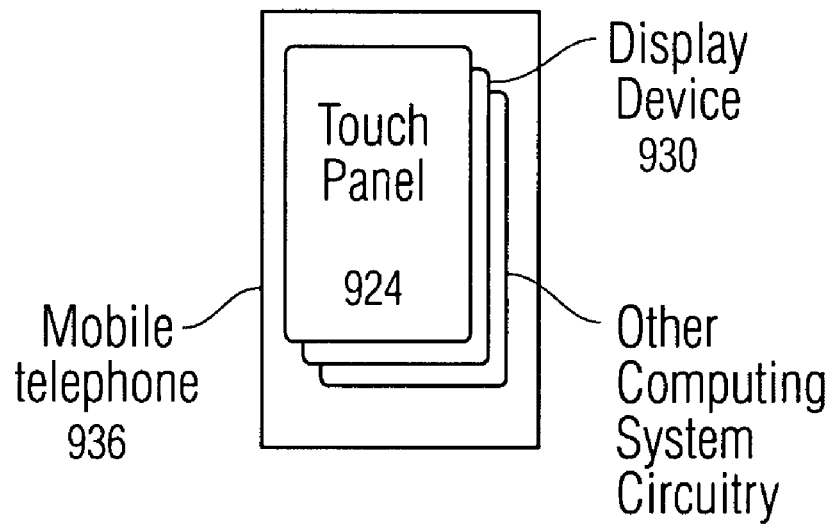
FIG. 9a illustrates an exemplary mobile telephone that can include a touch sensor panel, a display device, and other computing system blocks in the computing system of FIG. 1 that can execute the X and Y suppression functions and hysteresis filter according to one embodiment of this invention.

FIG. 9a illustrates an exemplary mobile telephone 936 that can include touch sensor panel 924, display device 930, and other computing system blocks in computing system 100 of FIG. 1 that can execute the X and Y suppression functions and hysteresis filter according to embodiments of the invention.

Figure 9B:
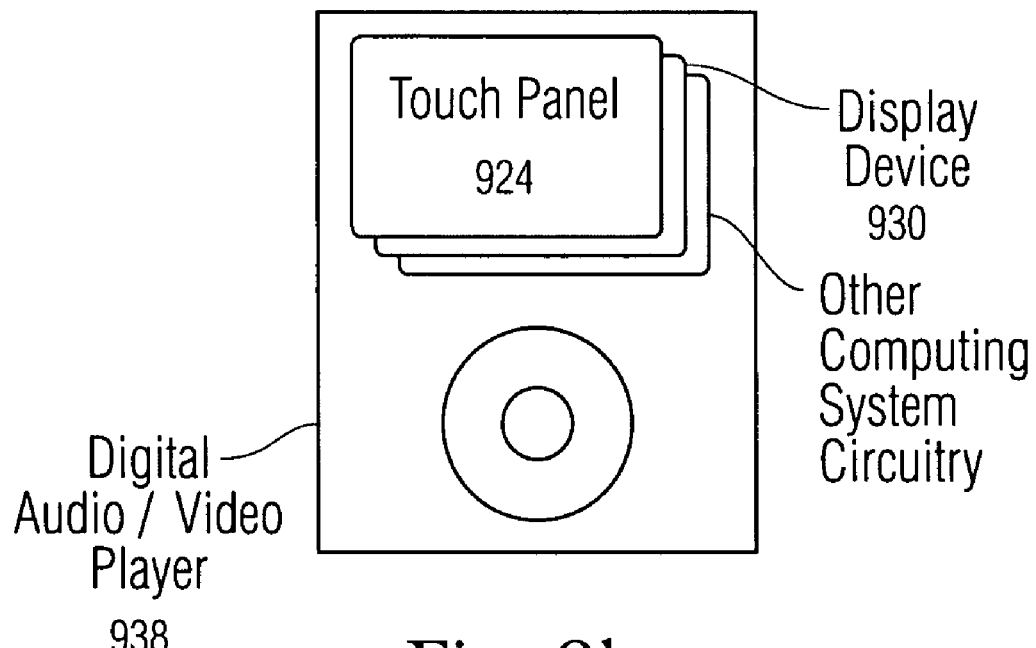
FIG. 9b illustrates an exemplary digital audio/video player that can include a touch sensor panel, a display device, and other computing system blocks in computing system of FIG. 1 that can execute the X and Y suppression functions and hysteresis filter according to one embodiment of this invention.

FIG. 9b illustrates an exemplary digital audio/video player 938 that can include touch sensor panel 924, display device 930, and other computing system blocks in computing system 100 of FIG. 1 that can execute the X and Y suppression functions and hysteresis filter according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for suppressing position change in a detected image of touch to assist in distinguishing tapping motions from sliding motions on a touch sensor panel, comprising:
   computing a time instability factor in accordance with a time instability function that provides a first amount of suppressed position change per frame for a given time since the image of touch was detected;
   subtracting the first amount of suppressed position change per frame from a first position change per frame value for the detected image of touch to obtain a suppressed position change per frame for the detected image of touch; and
   utilizing the suppressed position change per frame for the detected image of touch to assist in distinguishing tapping motions from sliding motions on the touch sensor panel.

2. The method of claim 1, the time instability function starting at a maximum suppressed position change per frame value at a time when the image if touch is first detected and tapering off to a minimum suppressed position change per frame value for a time greater than or equal to a predetermined delay after the image of touch was first detected.

3. The method of claim 1, wherein the first amount of position change per frame is a detected position change per frame.

4. The method of claim 1, further comprising:
   applying a hysteresis filter to a detected position change per frame to generate a reported position change per frame that delays the detected position change per frame by a predetermined number of pixels;
   wherein the first position change per frame is the reported position change per frame.

5. The method of claim 4, further comprising identifying the reported position change per frame as an actionable position change per frame if an event flag is set.

6. The method of claim 5, further comprising setting the event flag if the reported position change per frame is not from a detected hover event.

7. The method of claim 5, further comprising setting the event flag if the suppressed position change per frame is non-zero.

8. A method for suppressing position change in a detected image of touch to assist in distinguishing tapping motions from sliding motions on a touch sensor panel, comprising:
computing a touch instability factor in accordance with a touch instability function that provides a first amount of suppressed position change per frame for a given amount of touch instability per frame;
subtracting the first amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

9. The method of claim 8, the touch instability function starting at a minimum suppressed position change per frame value at zero percentage change in touch instability per frame and reaching a maximum suppressed position change per frame value for percentage changes in touch instability per frame greater than or equal to a predetermined percentage.

10. The method of claim 8, wherein the first amount of position change per frame is a detected position change per frame.

11. The method of claim 8, further comprising:
applying a hysteresis filter to a detected position change per frame to generate a reported position change per frame that delays the detected position change per frame by a predetermined number of pixels;
wherein the first position change per frame is the reported position change per frame.

12. The method of claim 11, further comprising identifying the reported position change per frame as an actionable position change per frame if an event flag is set.

13. The method of claim 12, further comprising setting the event flag if the reported position change per frame is not from a detected hover event.

14. The method of claim 12, further comprising setting the event flag if the suppressed position change per frame is non-zero.

15. A method for suppressing position change in a detected image of touch to assist in distinguishing tapping motions from sliding motions on a touch sensor panel, comprising:
computing a time instability factor in accordance with a time instability function that provides a first amount of suppressed position change per frame for a given time tpress since the image of touch was detected;
computing a touch instability factor in accordance with a touch instability function that provides a second amount of suppressed position change per frame for a given amount of touch instability per frame;
subtracting a larger of the first and second amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

16. The method of claim 15, the touch instability function starting at a maximum suppressed position change per frame value at a time when the image if touch is first detected and tapering off to a minimum suppressed position change per frame value for a time greater than or equal to a predetermined delay after the image of touch was first detected.

17. The method of claim 15, the touch instability function starting at a minimum suppressed position change per frame value at zero percentage change in touch instability per frame and reaching a maximum suppressed position change per frame value for percentage changes in touch instability per frame greater than or equal to a predetermined percentage.

18. The method of claim 15, wherein the first position change per frame is a detected position change per frame.

19. The method of claim 15, further comprising:
applying a hysteresis filter to a detected position change per frame to generate a reported position change per frame that delays the detected position change per frame by a predetermined number of pixels;
wherein the first position change per frame is the reported position change per frame.

20. The method of claim 19, further comprising identifying the reported position change per frame as an actionable position change per frame if an event flag is set.

21. The method of claim 20, further comprising setting the event flag if the reported position change per frame is not from a detected hover event.

22. The method of claim 20, further comprising setting the event flag if the suppressed position change per frame is non-zero.

23. A method for suppressing position change in a detected image of touch to assist in distinguishing tapping motions from sliding motions on a touch sensor panel, comprising:
computing a time instability factor in accordance with a time instability function that provides a first amount of suppressed position change per frame immediately after the image of touch is detected to account for position changes during touchdown, and tapering off thereafter;
computing a touch instability factor in accordance with a touch instability function that provides a second amount of suppressed position change per frame for large amounts of touch instability per frame to account for position changes during touchdown and liftoff;
subtracting a larger of the first and second amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

24. The method of claim 23, the touch instability function starting at a maximum suppressed position change per frame value at a time when the image if touch is first detected and tapering off to a minimum suppressed position change per frame value for a time greater than or equal to a predetermined delay after the image of touch was first detected.

25. The method of claim 23, the touch instability function starting at a minimum suppressed position change per frame value at zero percentage change in touch instability per frame and reaching a maximum suppressed position change per frame value for percentage changes in touch instability per frame greater than or equal to a predetermined percentage.

26. The method of claim 23, wherein the first position change per frame is a detected position change per frame.

27. The method of claim 23, further comprising:
applying a hysteresis filter to a detected position change per frame to generate a reported position change per frame that delays the detected position change per frame by a predetermined number of pixels;
wherein the first position change per frame is the reported position change per frame.

28. The method of claim 27, further comprising identifying the reported position change per frame as an actionable position change per frame if an event flag is set.

29. The method of claim 28, further comprising setting the event flag if the reported position change per frame is not from a detected hover event.

30. The method of claim 28, further comprising setting the event flag if the suppressed position change per frame is non-zero.

31. A computer-readable medium comprising program code for suppressing position change in a detected image of touch to assist in distinguishing tapping motions from sliding motions on a touch sensor panel, the program code for causing performance of a method comprising:
computing a time instability factor in accordance with a time instability function that provides a first amount of suppressed position change per frame for a given time since the image of touch was detected;
subtracting the first amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

32. The computer-readable medium of claim 31, the time instability function starting at a maximum suppressed position change per frame value at a time when the image if touch is first detected and tapering off to a minimum suppressed position change per frame value for a time greater than or equal to a predetermined delay after the image of touch was first detected.

33. The computer-readable medium of claim 31, wherein the first amount of position change per frame is a detected position change per frame.

34. The computer-readable medium of claim 31, the program code further for causing performance of a method comprising:
applying a hysteresis filter to a detected position change per frame to generate a reported position change per frame that delays the detected position change per frame by a predetermined number of pixels;
wherein the first position change per frame is the reported position change per frame.

35. The computer-readable medium of claim 34, the program code further for causing performance of a method comprising identifying the reported position change per frame as an actionable position change per frame if an event flag is set.

36. The computer-readable medium of claim 35, the program code further for causing performance of a method comprising setting the event flag if the reported position change per frame is not from a detected hover event.

37. The computer-readable medium of claim 35, the program code further for causing performance of a method comprising setting the event flag if the suppressed position change per frame is non-zero.

38. A computer-readable medium comprising program code for suppressing position change in a detected image of touch to assist in distinguishing tapping motions from sliding motions on a touch sensor panel, the program code for causing performance of a method comprising:
computing a touch instability factor in accordance with a touch instability function that provides a first amount of suppressed position change per frame for a given amount of touch instability per frame;
subtracting the first amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

39. The computer-readable medium of claim 38, the touch instability function starting at a minimum suppressed position change per frame value at zero percentage change in touch instability per frame and reaching a maximum suppressed position change per frame value for percentage changes in touch instability per frame greater than or equal to a predetermined percentage.

40. The computer-readable medium of claim 38, wherein the first amount of position change per frame is a detected position change per frame.

41. The computer-readable medium of claim 38, the program code further for causing performance of a method comprising:
applying a hysteresis filter to a detected position change per frame to generate a reported position change per frame that delays the detected position change per frame by a predetermined number of pixels;
wherein the first position change per frame is the reported position change per frame.

42. The computer-readable medium of claim 41, the program code further for causing performance of a method comprising identifying the reported position change per frame as an actionable position change per frame if an event flag is set.

43. The computer-readable medium of claim 42, the program code further for causing performance of a method comprising setting the event flag if the reported position change per frame is not from a detected hover event.

44. The computer-readable medium of claim 42, the program code further for causing performance of a method comprising setting the event flag if the suppressed position change per frame is non-zero.

45. A computer-readable medium comprising program code for suppressing position change in a detected image of touch to assist in distinguishing tapping motions from sliding motions on a touch sensor panel, the program code for causing performance of a method comprising:
computing a time instability factor in accordance with a time instability function that provides a first amount of suppressed position change per frame for a given time since the image of touch was detected;
computing a touch instability factor in accordance with a touch instability function that provides a second amount of suppressed position change per frame for a given amount of touch instability per frame;
subtracting a larger of the first and second amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

46. The computer-readable medium of claim 45, the time instability function starting at a maximum suppressed position change per frame value at a time when the image if touch is first detected and tapering off to a minimum suppressed position change per frame value for a time greater than or equal to a predetermined delay after the image of touch was first detected.

47. The computer-readable medium of claim 45, the touch instability function starting at a minimum suppressed position change per frame value at zero percentage change in touch instability per frame and reaching a maximum suppressed position change per frame value for percentage changes in touch instability per frame greater than or equal to a predetermined percentage.

48. The computer-readable medium of claim 45, wherein the first position change per frame is a detected position change per frame.

49. The computer-readable medium of claim 45, the program code further for causing performance of a method comprising:
applying a hysteresis filter to a detected position change per frame to generate a reported position change per frame that delays the detected position change per frame by a predetermined number of pixels;
wherein the first position change per frame is the reported position change per frame.

50. The computer-readable medium of claim 49, the program code further for causing performance of a method comprising identifying the reported position change per frame as an actionable position change per frame if an event flag is set.

51. The computer-readable medium of claim 50, the program code further for causing performance of a method comprising setting the event flag if the reported position change per frame is not from a detected hover event.

52. The computer-readable medium of claim 50, the program code further for causing performance of a method comprising setting the event flag if the suppressed position change per frame is non-zero.

53. A computing system comprising the computer-readable medium of claim 45.

54. A mobile telephone comprising the computing system of claim 53.

55. A digital audio player comprising the computing system of claim 53.

56. A mobile telephone including a computer-readable medium comprising program code for suppressing position change in a detected image of touch to assist in distinguishing tapping motions from sliding motions on a touch sensor panel, the program code for causing performance of a method comprising:
computing a time instability factor in accordance with a time instability function that provides a first amount of suppressed position change per frame for a given time since the image of touch was detected;
computing a touch instability factor in accordance with a touch instability function that provides a second amount of suppressed position change per frame for a given amount of touch instability per frame;
subtracting a larger of the first and second amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

57. A digital audio player including a computer-readable medium comprising program code for suppressing position change in a detected image of touch to assist in distinguishing tapping motions from sliding motions on a touch sensor panel, the program code for causing performance of a method comprising:
computing a time instability factor in accordance with a time instability function that provides a first amount of suppressed position change per frame for a given time since the image of touch was detected;
computing a touch instability factor in accordance with a touch instability function that provides a second amount of suppressed position change per frame for a given amount of touch instability per frame;
subtracting a larger of the first and second amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

58. An apparatus for suppressing position change in a detected image of touch to assist in distinguishing tapping motions from sliding motions on a touch sensor panel, comprising:
means for computing a time instability factor in accordance with a time instability function that provides a first amount of suppressed position change per frame for a given time since the image of touch was detected;
means for computing a touch instability factor in accordance with a touch instability function that provides a second amount of suppressed position change per frame for a given amount of touch instability per frame, wherein Z represents a total finger signal for the detected image of touch;
means for subtracting a larger of the first and second amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

59. A computer-readable medium comprising program code for suppressing position change in a detected image of touch to assist in distinguishing tapping motions from sliding motions on a touch sensor panel, the program code for causing performance of a method comprising:
computing a time instability factor in accordance with a time instability function that provides a first amount of suppressed position change per frame immediately after the image of touch is detected to account for position changes during touchdown, and tapering off thereafter;
computing a touch instability factor in accordance with a touch instability function that provides a second amount of suppressed position change per frame for large amounts of touch instability per frame to account for position changes during touchdown and liftoff;
subtracting a larger of the first and second amount of suppressed position change per frame from a first position change per frame value for the detected image of touch to obtain a suppressed position change per frame for the detected image of touch; and
utilizing the suppressed position change per frame for the detected image of touch to assist in distinguishing tapping motions from sliding motions on the touch sensor panel.

60. The computer-readable medium of claim 59, the time instability function starting at a maximum suppressed position change per frame value at a time when the image if touch is first detected and tapering off to a minimum suppressed position change per frame value for a time greater than or equal to a predetermined delay after the image of touch was first detected.

61. The computer-readable medium of claim 59, the touch instability function starting at a minimum suppressed position change per frame value at zero percentage change in touch instability per frame and reaching a maximum suppressed position change per frame value for percentage changes in touch instability per frame greater than or equal to a predetermined percentage.

62. The computer-readable medium of claim 59, wherein the first position change per frame is a detected position change per frame.

63. The computer-readable medium of claim 59, the program code further for causing performance of a method comprising:

applying a hysteresis filter to a detected position change per frame to generate a reported position change per frame that delays the detected position change per frame by a predetermined number of pixels;

wherein the first position change per frame is the reported position change per frame.

64. The computer-readable medium of claim 63, the program code further for causing performance of a method comprising identifying the reported position change per frame as an actionable position change per frame if an event flag is set.

65. The computer-readable medium of claim 64, the program code further for causing performance of a method comprising setting the event flag if the reported position change per frame is not from a detected hover event.

66. The computer-readable medium of claim 64, the program code further for causing performance of a method comprising setting the event flag if the suppressed position change per frame is non-zero.

* * * * *

UNITED STATES PATENT AND TRADEMARK OFFICE
CERTIFICATE OF CORRECTION

| | | |
|---|---|---|
| PATENT NO. | : 7,932,896 B2 | Page 1 of 1 |
| APPLICATION NO. | : 11/818476 | |
| DATED | : April 26, 2011 | |
| INVENTOR(S) | : Wayne Carl Westerman | |

It is certified that error appears in the above-identified patent and that said Letters Patent is hereby corrected as shown below:

In column 6, line 66, delete "☐ *Tinst*)" and insert -- *Tinst*) --, therefor.

In column 10, line 45, in claim 2, delete "if" and insert -- of --, therefor.

In column 11, line 48, in claim 15, before "since" delete "tpress".

In column 11, line 64, in claim 16, delete "if" and insert -- of --, therefor.

In column 12, line 49, in claim 24, delete "if" and insert -- of --, therefor.

In column 13, line 30, in claim 32, delete "if" and insert -- of --, therefor.

In column 14, line 66, in claim 46, delete "if" and insert -- of --, therefor.

In column 16, line 33, in claim 58, delete "wherein Z" and insert -- wherein touch --.

In column 17, line 3, in claim 60, delete "if" and insert -- of --, therefor.

Signed and Sealed this
Sixth Day of December, 2011

David J. Kappos
*Director of the United States Patent and Trademark Office*